United States Patent
Myers et al.

(10) Patent No.: US 8,459,389 B2
(45) Date of Patent: Jun. 11, 2013

(54) INTEGRATED PUMP, COOLANT FLOW CONTROL AND HEAT EXCHANGE DEVICE

(75) Inventors: John W. Myers, Howell, MI (US); Mark A. Bourcier, Canton, MI (US)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 0 days.

(21) Appl. No.: 13/338,657

(22) Filed: Dec. 28, 2011

(65) Prior Publication Data

US 2012/0168118 A1 Jul. 5, 2012

Related U.S. Application Data

(63) Continuation-in-part of application No. 12/982,846, filed on Dec. 30, 2010.

(51) Int. Cl.
*F01P 7/14* (2006.01)

(52) U.S. Cl.
USPC .................................. 180/68.4; 123/41.08

(58) Field of Classification Search
USPC ............ 180/68.1, 68.2, 68.4; 123/41.08–41.1
See application file for complete search history.

(56) References Cited

U.S. PATENT DOCUMENTS

| | | | | |
|---|---|---|---|---|
| 5,121,714 A * | 6/1992 | Susa et al. | ..................... | 123/41.1 |
| 6,182,749 B1 * | 2/2001 | Brost et al. | ..................... | 165/297 |
| 6,394,210 B2 * | 5/2002 | Matsuda et al. | ............. | 180/68.1 |
| 6,705,586 B2 * | 3/2004 | Williges | .................... | 251/129.04 |
| 6,796,375 B2 * | 9/2004 | Williges | ........................ | 165/297 |
| 6,997,143 B2 * | 2/2006 | Piccirilli et al. | ............. | 123/41.1 |
| 7,077,776 B2 * | 7/2006 | Sorab et al. | .................... | 475/161 |
| 7,395,787 B1 * | 7/2008 | Claypole et al. | ........... | 123/41.01 |
| 7,617,897 B2 * | 11/2009 | Hiroshima | .................... | 180/68.4 |
| 2003/0217707 A1 * | 11/2003 | Iwasaki | ...................... | 123/41.31 |
| 2004/0187805 A1 * | 9/2004 | Arisawa et al. | ............. | 123/41.14 |
| 2006/0040154 A1 * | 2/2006 | Makuta et al. | ................... | 429/26 |
| 2006/0096553 A1 * | 5/2006 | Takahashi | .................... | 123/41.1 |
| 2006/0162677 A1 * | 7/2006 | Piddock et al. | .............. | 123/41.1 |
| 2010/0116458 A1 * | 5/2010 | Kim | ............................... | 165/41 |
| 2010/0121508 A1 * | 5/2010 | Murata et al. | ................... | 701/22 |
| 2011/0120396 A1 * | 5/2011 | Myers et al. | ............... | 123/41.08 |
| 2011/0126783 A1 * | 6/2011 | Hwang et al. | ................. | 123/41.1 |
| 2012/0168138 A1 * | 7/2012 | Myers et al. | ................... | 165/200 |
| 2012/0210954 A1 * | 8/2012 | Nishikawa et al. | ........ | 123/41.08 |

* cited by examiner

*Primary Examiner* — Jeffrey J Restifo
*Assistant Examiner* — Erez Gurari
(74) *Attorney, Agent, or Firm* — Edwards Wildman Palmer LLP; Peter F. Corless

(57) ABSTRACT

A coolant flow control management system includes an integrated pump coolant flow control and heat exchange device for delivering engine coolant to and from the engine. According to the system, coolant flows from the engine and is delivered back to the engine after passing through various coolant branches while flow is regulated by a control valve part of said device, then passes through a heat exchanger part before being returned to the engine by a pump part. Systems of the invention are particularly useful with all-electric and hybrid vehicles.

22 Claims, 6 Drawing Sheets

INTEGRATED PUMP, COOLANT FLOW CONTROL AND HEAT EXCHANGE DEVICE

This application is a continuation-in-part of copending U.S. application Ser. No. 12/982,846, filed Dec. 30, 2010, the teachings of which are incorporated herein by reference.

BACKGROUND (a) Technical Field

The present invention generally relates to systems and devices for delivering coolant to an engine of a vehicle, such as electric-powered vehicles and hybrid vehicles (e.g., vehicles powered by an electric motor(s) and/or an internal combustion engine). More particularly, the present invention relates to an integrated pump, coolant flow control and heat exchange device and systems embodying same and yet more particularly, to such an integrated pump, flow control and heat exchange device having the ability to simultaneously control flow paths and flow volume.

(b) Background Art

Generally, a vehicle includes an engine, a transmission, a unit heater, a radiator, a pump for delivering coolant to the engine, and an engine control module. A typical cooling system used in a vehicle includes three main flow circuits: an engine bypass circuit, a circuit including a unit heater, and a circuit including a radiator.

Coolant flow may be controlled by a simple traditional wax pellet fixed temperature thermostat or a more complex coolant control valve with a drive motor, which has been developed as a replacement to the traditional wax pellet type thermostat. The coolant control valve changes coolant flow within the circuits based on a signal from a vehicle engine control module unit which is derived from engine coolant temperature.

The coolant control valve reduces engine warm up time by blocking coolant flow at initial cold start and also allowing the engine (coolant and oil) to operate at a higher temperature during normal driving to improve the engine lubricity by controlling the coolant temperature (and engine oil by default) within the engine at higher average temperatures.

The coolant control valve, however, does not provide a more rapid increase in the temperature of the transmission oil circuit because of the positional limitation of a transmission oil cooler. More specifically, the transmission oil cooler is typically located in a radiator end tank (i.e., oil to liquid (coolant) type heat exchanger), in the air stream (i.e., air to oil cooler) in front of the vehicle engine cooling module, or both in series depending on the transmission cooling demand requirements. Alternatively, it may be provided as a remotely mounted stand alone oil to coolant type cooler.

Such a transmission oil cooler is located within one of the three main flow circuits or an auxiliary circuit. Accordingly, as the coolant flows through the multiple coolant circuits, the transmission oil cooler is not fully utilizing the maximum cooling potential available for transmission oil cooling.

In the case where the transmission oil cooler is located in the front end area of the vehicle (either in the radiator tank or air stream), during cold weather driving, the transmission oil is typically cooled to the minimum operating temperature if allowed to flow within the heat exchangers provided for cooling. This causes the oil to warm up slowly and also can cause the oil to operate at a temperature which is lower than the temperature for optimum transmission oil lubricity. As a result, more transmission mechanical drag can be caused and vehicle fuel economy during cold weather conditions can be reduced. In case of the air to oil transmission oil cooler, if there is no temperature bypass valve in the flow circuit, the oil in the cooler can get so cold and thick that the oil cooler may freeze and may not ever allow oil to pass through the cooler. In some cases, this may cause the transmission to be overheated and be damaged due to no oil flow through the transmission oil cooler.

An additional parasitic loss to the engine fuel economy performance is the engine driven mechanical water pump. The engine driven mechanical water pump always operates at some multiple or fraction of engine speed regardless of ambient temperatures or actual cooling requirements. Some vehicles have recently introduced an electric water pump on an internal combustion engine but this design traditionally has been avoided due to vehicle electrical power limitations because of the high current draw required to support a stand alone water pump capable of flowing enough coolant to properly cool the vehicle. As is known to those skilled in the art, such a engine driven mechanical water pump or front end assembly drive (FEAD) mechanically driven impellor/pulley water pump is driven by the engine so as to rotate at a multiple of the crankshaft rotational speed. Typically, the pump pulley is operably coupled to the crankshaft by a belt (e.g., serpentine belt).

Although devices and systems were proposed to increase the speed of transmission oil warm up, as disclosed in, for example, U.S. Pat. Nos. 6,182,749; 6,371,060; 6,997,143; 6,705,586; 6,796,375; 7,077,776 and 7,168,397, there is still a need for an improved device or system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In its broadest aspects, the present invention features an integrated coolant delivery, flow control and heat exchange device which pumps or delivers coolant to an engine while controlling multiple flow modes and coolant paths to branch out (or converge) from (or to) a coolant flow valve which in turn controls all paths of coolant flow through a heat exchange mixing box. Such an integrated coolant delivery, flow control and heat exchange device should improve both fuel economy and management of heat exchange between components of a vehicle using such a device. More particularly, such improvement is expected when using the device of the present invention for a number of reasons including, for example, (a) optimizing flow control speed to actual needs rather than engine speed; (b) keeping the pump off on a cold start; (c) allowing interior heating with engine coolant rather than electric auxiliary heat on shutdown (start-stop for hybrids); (d) allowing faster oil warm-up (both engine & transmission); (e) allowing faster cold engine warm-up (optimize coolant flow); (f) reducing water pump load (minimize high flow pressure drop); (g) improving temperature control (minimize coolant and engine oil temperature variation within engine and increase cold weather transmission oil operating temperatures ("Oil heating mode in cold weather conditions"); and/or (h) allowing for engine coolant operating temperature calibration for optimum efficiency at any operating condition through the engine control module or other control device (e.g., digital signal processor) as is known to those skilled in the art and suitable for the intended purpose.

According to one aspect of the present invention, there is featured an integrated coolant delivery, flow control and heat exchange system that includes a pump for delivering engine coolant to the engine of a vehicle and a coolant flow control and heat exchange device for a vehicle, where the pump is operably and fluidly coupled to the coolant flow control and heat exchange device so as to form an integrated assembly. In a more particular embodiment, such a system includes a pump part including the pump, and the coolant flow control and heat exchange device further includes a valve body part and a heat exchange part, where the valve body part is operably and fluidly coupled to the heat exchange part so as to also form an integrated assembly.

The integrated pump part of such a system of the invention suitably may comprise a pump housing unit which is an integrated (e.g., molded to) component on the system. For instance, the pump housing unit may be integrated (e.g., molded to or with) to a heat exchange unit of the system. Alternatively, the integrated pump part and valve part are separate units that is/are mechanically secured (e.g., bolted, secured by adhesives, welding) to a housing of the heat exchange part, so as to integrate the valve and/or pump parts with the integrated coolant flow control and heat exchange device.

The pump part and pump housing unit may suitably comprise a pump motor assembly which may comprise an electric motor and further elements particularly an impeller assembly and control circuit portion, which elements may be affixed (e.g., bolted, secured by adhesives, welding) within or to the pump housing unit. The pump motor assembly may be suitably controlled by the engine control module or other control device such as a digital signal processor or a smart controller as is known to those skilled in the art and suitable for the intended purpose. For the digital signal processor or smart controller, the device/controller receive inputs representative of vehicle operational conditions and convert such inputs so as to control the operation of the pump and thereby regulate flow of the coolant. Similarly, the wall(s) of the valve body part also can be controlled by such an engine control module or other control device such as a digital signal processor or smart controller so as to further regulate and control flow of the coolant.

According to another aspect of the present invention, there is featured an integrated pump, coolant flow control and heat exchange device for a vehicle, which includes a heat exchange part, a valve body part, and a pump part. More particularly, the pump part draws coolant through the heat exchange part and the valve body part and delivers such coolant to the engine. According to this aspect of the present invention, the heat exchange part and the valve body part are operably coupled to each other so that any bypass flow or the bypass flow circuit is internalized between these two components. As described further herein, in this aspect, return flow from coolant flow circuits that are external to the integrated pump, coolant flow control and heat exchange device, is split between the heat exchange part and the valve body part. In embodiments of the present invention, such an integrated pump, coolant flow control and heat exchange device, further includes an electric motor and/or internal combustion engine, a transmission, a unit heater, a radiator, and an engine control module or other control device such as a digital signal processor or smart controller as is known to those skilled in the art and suitable for the intended purpose. Other embodiments/ features of this aspect are described below/herein.

Such a pump part may suitable comprise a pump housing unit which is an integrated (e.g., molded to) component of the integrated pump, coolant flow control and heat exchange device. For example, the pump housing unit may be suitably integrated (e.g., molded to or with) with the housing of the heat exchange unit. Alternatively, the pump part is a separate unit that is mechanically secured (e.g., bolted, secured by adhesives, welding) to the housing of the heat exchange part, so as to integrated with the integrated pump, coolant flow control and heat exchange device.

For example, the housing of the heat exchange unit further includes a mounting surface and the pump housing unit includes a complementary mounting surface and the pump housing unit is mechanically secured to the heat exchange unit at the mounting surface thereof. As indicated herein, the valve body part also can be a separate unit that is mechanically secured (e.g., bolted, secured by adhesives, welding) to the housing of the heat exchange part, so as to be thereby integrated with the integrated pump, coolant flow control and heat exchange device.

Such a pump part may suitably comprise a pump motor assembly which may comprise an electric motor and further elements particularly an impeller assembly and control circuit portion, which elements may be affixed (e.g., bolted) within or to the pump housing unit. The pump motor assembly may be suitably controlled by the engine control module or other control device such as a digital signal processor or smart controller as is known to those skilled in the art and suitable for the intended purpose.

The heat exchange part includes an outlet for discharging coolant from the heat exchange part into the pump, a first inlet for receiving coolant coming from the radiator, a second inlet for receiving coolant coming from the unit heater, and a heat exchanger provided inside the heat exchange part. The heat exchanger includes an inlet for receiving from a source of supply, another vehicle fluid and an outlet for discharging the other vehicle fluid from the heat exchanger toward the supply source, by which the heat exchanger is in fluid communication with the supply source.

The valve body part includes an inlet for receiving coolant coming from the engine, a first outlet for discharging coolant from the valve body part toward the radiator, and a second outlet for discharging coolant from the valve body part toward the unit heater.

The valve body part further includes a third outlet and the heat exchange part further includes a third inlet. The third outlet of the valve body part is connected to the third inlet of the heat exchange part, thereby making the valve body part and the heat exchange part in fluid communication with each other. This fluid connection between the respective third inlet and the respective third outlet, functions as the engine bypass so that none, some or all of the coolant inside the valve body part is delivered to the heat exchange part to warm up and cool down the vehicle fluid inside the heat exchanger by heat exchange therebetween.

According to yet another aspect of the present invention, there is featured yet another integrated pump coolant flow control and heat exchange device that includes a heat exchange part, a pump part, and a valve body part. According to this aspect of the present invention, the valve body part is operably coupled to a bypass flow circuit that is external to the integrated pump coolant flow control and heat exchange device. Also in this aspect and as further described herein, the heat exchange part and the valve body part are arranged so that the valve body part receives return coolant flow from other or all circuits external to the integrated pump coolant flow control and this return flow is communicated to the heat exchange part via the valve body part. More particularly, the pump part draws coolant through the valve body and the heat exchange part and delivers such coolant to the engine. In embodiments of the present invention, such an integrated pump, coolant flow control and heat exchange device, further includes an electric motor and/or internal combustion engine, a transmission, a unit heater, a radiator, and an engine control module. Other embodiments/features of this aspect are described below/herein.

The heat exchange part includes an outlet for discharging coolant from the heat exchange part into the pump part and a heat exchanger provided inside the heat exchange part. The heat exchanger includes an inlet for receiving another vehicle fluid from a supply source and an outlet for discharging the other vehicle fluid from the heat exchanger toward the fluid supply source by which the heat exchanger is in fluid communication with the fluid supply source.

The valve body part includes a first inlet for receiving coolant coming from the engine, a second inlet for receiving coolant coming from the radiator, and a third inlet for receiving coolant coming from the unit heater. The valve body part further includes an outlet and the heat exchange part further includes an inlet. The outlet of the valve body part is connected (e.g., fluidly coupled) to the inlet of the heat exchange part so that all of the coolant inside the valve body part can be delivered to the heat exchange part to warm up and cool down the vehicle fluid inside the heat exchanger by heat exchange there between.

In embodiments, such an integrated pump coolant flow control and heat exchange device is configured so that the valve body part is located upstream of the heat exchange part and is down stream of all other branch coolant circuits within the system such that the coolant leaving the engine flows through all branch coolant circuits before entering the valve body part. In addition, an external branch coolant circuit is provided fluidly coupling the engine to the first inlet so as to provide a flowpath for engine bypass flow.

Such a pump part includes a pump for delivering engine coolant to the engine. Such a pump part may suitable comprise a pump housing unit which is an integrated (e.g., molded) component on the system. Such a pump housing unit, for example, is suitably integrated (e.g., molded to or with) with the housing of the heat exchange unit. As indicated herein, alternatively the pump part is a separate unit that is mechanically secured (e.g., bolted, secured by adhesives, welding) to the housing of the heat exchange part, so as to be thereby integrated with the integrated pump, coolant flow control and heat exchange device. As also indicated herein, the valve body part also can be a separate unit that is mechanically secured (e.g., bolted, secured by adhesives, welding) to the housing of the heat exchange part, so as to be thereby integrated with the integrated pump, coolant flow control and heat exchange device.

In further embodiments, such a pump housing unit includes a pump motor assembly which suitably includes an electric motor and further elements particularly an impeller assembly and control circuit portion, which elements may be affixed (e.g., bolted) within or to the pump housing unit. The pump motor assembly may be suitably controlled by the engine control module or other control device such as a digital signal processor or smart controller as is known to those skilled in the art and suitable for the intended purpose. Such other control device or smart controller can be further configured so as to receive inputs representative of vehicle operational conditions and convert such inputs so as to control the operation of the pump and thereby regulate flow of the coolant. Similarly, the wall(s) of the valve body part also can be controlled by such an engine control module or other control device such as a digital signal processor or smart controller so as to further regulate and control flow of the coolant.

In yet further aspects of the present invention, the integrated coolant delivery, flow control and heat exchange systems and/or integrated pump coolant flow control and heat exchange devices of the present invention, further include a control system that is operably coupled to the pump, valve body part and other functionalities of such systems and devices. Such a control system is configured and arranged so as to control the pump, valve body and other functionalities of such systems and devices so as to carry out the functions of such systems and devices of the present invention as described herein. In particular embodiments such a control system includes a controller such as an engine control module or other control device (e.g., digital signal processor) as is known to those skilled in the art and suitable for the intended purpose that are configured so as to receive inputs concerning operational characteristics of the coolant and pump, valve body and other functionalities of such systems and devices and operational parameters concerning the engine so as to control the pump, valve body and other functionalities of the integrated coolant delivery, flow control and heat exchange systems and/or integrated pump coolant flow control and heat exchange devices of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of propulsion/power, for example both gasoline-powered and electric-powered. As discussed herein, preferred vehicles for use with systems of the invention include electric-powered vehicles (which comprise an electric motor) and hybrid vehicles (particularly gasoline-electric hybrids which may comprise both a petroleum (e.g., gasoline) powered engine and electric motor).

It should be recognized that the systems and devices of the present invention are not limited solely to applications involving such vehicles. It is within the scope of the present invention for the devices and/or systems of the present invention to be used in other applications in which internal combustion engines are used, for example, stand alone internal combustion engines or an internal combustion engine operably coupled to an electric generator for generating electrical power or an internal combustion engine operably coupled to any other device known in the art.

The above and other aspects and features of the present invention are discussed below.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
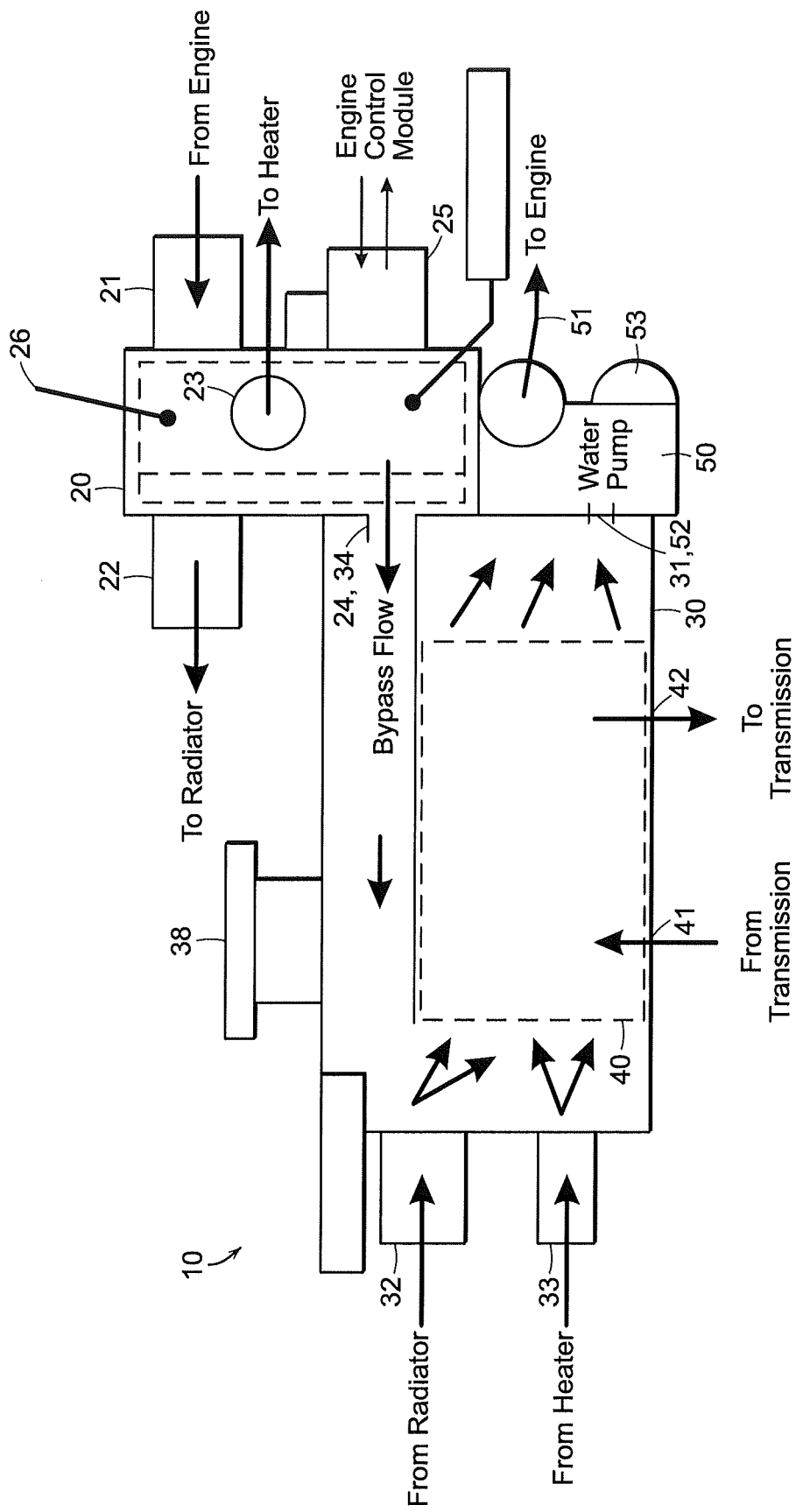
FIG. 1 shows an integrated pump, coolant flow control and heat exchange device according to a first aspect/embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As discussed above, we now provide an integrated pump, flow control and heat exchange device and an integrated coolant delivery, flow control and heat exchange system (e.g., coolant flow system) embodying such an integrated pump, flow control and heat exchange device. Such systems or devices in their broadest aspects, pump or deliver coolant to an engine (e.g., internal combustion engine and/or electric motor or electric drive motor) while controlling multiple flow modes and coolant paths to, branch out (or converge) from (or to) a coolant flow valve which in turn controls all paths of coolant flow through a heat exchange mixing box. In more particular aspects, such systems and devices of the present invention, comprises an integrated pump for delivering engine coolant to the engine, coolant flow control and heat exchange device for a vehicle.

Systems and devices of the invention can provide notable advantages over prior systems, including for example, eliminating the need for the front end assembly drive (FEAD) mechanically driven impellor/pulley water pump; thereby potentially simplifying and/or eliminating certain connecting tubes, hose and clamp parts; improving coolant flow rate control; and/or providing reductions in weight and manufacturing costs.

As also discussed herein, systems and devices of the invention are particularly useful for hybrid and all-electric vehicles which can require a stand-alone water pump as a component of the cooling system. For such vehicles, systems of the invention can eliminate the need for a circulation pump and in the case of hybrid vehicles, eliminate the need for FEAD mechanically driven impellor/pulley water pump; eliminate certain connecting tubes, hose and clamp parts; and provide reductions in weight and manufacturing costs.

As also discussed herein, such systems and devices of the present invention are not limited solely to applications involving such vehicles. It is within the scope of the present invention for such devices and/or systems to be used in other applications in which internal combustion engines are used, for example, stand alone internal combustion engines or an internal combustion engine operably coupled (a) to an electric generator for generating electrical power, (b) to a water pump for pumping of water or (c) to other device known in the art that is operably coupled to an internal combustion engine.

According to one aspect of the present invention, an integrated pump coolant flow control and heat exchange device for a vehicle is provided, the device comprising: (a) a pump for delivering engine coolant to an engine; (b) a heat exchange part which discharges the coolant from the heat exchange part toward the pump; and (c) a coolant flow control unit, wherein the pump and heat exchange part form an integrated unit.

In a further aspect, there is provided an integrated coolant delivery, flow control and heat exchange system or a coolant flow system for a vehicle where such a coolant flow system includes an engine and an integrated pump coolant flow control and heat exchange device that is in fluid communication with the engine for delivering coolant to the engine as well as other flow circuits that are operably coupled to the integrated pump coolant flow control and heat exchange device. Such an integrated pump coolant flow control and heat exchange device includes a pump in fluid communication with the engine for delivering coolant to the engine, a valve body part and a heat exchange part. The valve body part is in fluid communication with the heat exchange part and controls the coolant flow from the engine to a flow circuit and the heat exchange part. The heat exchange part is in turn in fluid communication with the valve and other flow circuits and delivers the fluid to the pump.

According to this aspect of the present invention and as described further herein, the heat exchange part and the valve body part are operably coupled to each other so that any bypass flow or the bypass flow circuit is internalized between these two components. As also described further herein, the valve body part receives all coolant flow from the engine and controls the coolant flow to the other flow circuits and the heat exchange part. The heat exchange part receives all flow circuits (return flow and bypass flow) and passes flow over heat exchanger(s) before returning all coolant flow back to the integrated pump.

The valve body part is in fluid communication with the engine so as to receive all of the coolant coming from the engine. A radiator is provided in a first branch coolant circuit and is in fluid communication with the valve body part so as to receive none, some or all of the coolant coming from the valve body part. A unit heater is provided in a second branch coolant circuit and is in fluid communication with the valve body part so as to receive none, some or all of the coolant coming from the valve body part. An engine bypass is provided in a third branch coolant circuit and is in fluid communication with the heat exchange part so as to deliver none, some or all of the coolant coming from the valve body part.

The coolant passing through the first branch coolant circuit is delivered back to the pump after passing through the heat exchange part. The coolant passing through the second branch coolant circuit is delivered back to the pump after passing through the heat exchange part. The coolant passing through the third branch coolant circuit is delivered back to the pump after passing through the heat exchange part.

In yet a further aspect, another coolant flow control system for a vehicle is provided, such a system comprising: an engine; a pump in fluid communication with the engine for delivering coolant to the engine; an integrated pump coolant flow control and heat exchange device including a valve body part, a heat exchange part, a pump part and coolant flow circuits. The engine is in fluid communication with the flow circuits and the flow circuits are in fluid communication with the integrated pump coolant flow control and heat exchange device. The heat exchange part is in fluid communication with the integrated pump, the valve body part is in fluid communication with all of the coolant flow circuits, and the heat exchange device and pump are integrated so as to form a unitary device. A radiator is provided in a first branch coolant circuit and is in fluid communication with the engine so as to receive none, some or all of the coolant coming from the engine. A unit heater is provided in a second branch coolant circuit and is in fluid communication with the engine so as to receive none, some or all of the coolant coming from the engine. An engine bypass is provided in a third branch coolant circuit and is in fluid communication with the engine so as to receive none, some or all of the coolant coming from the engine. Further, the coolant passing through the first branch coolant circuit is delivered back to the pump after passing through the valve body part and the heat exchange part, and the coolant passing through the second branch coolant circuit is delivered back to the pump after passing through the valve body part and the heat exchange part and the coolant passing through the third branch coolant circuit is delivered back to the pump after passing through the valve body part and the heat exchange part. The flow through the various paths are controlled by the valve body part which allows none, some or all of the coolant to pass through the branches dependent upon specific engine conditions Hereinafter reference will now be made in detail to various embodiments of the present invention, examples of which are illustrated in the accompanying drawings and described below/further herein. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

There is shown in FIG. 1, an integrated pump, coolant flow control and heat exchange device 10 for a vehicle according to a first embodiment of the present invention. The vehicle suitably includes an internal combustion engine and/or an electric motor 12, a transmission, a unit heater, a radiator, and an engine control module. It should be understood that if the following discussion refers to coolant being returned to or flowing through the engine or internal combustion engine, this is not limiting to the particular embodiment. It shall be understood that the reference to an engine also includes coolant flowing and being returned to the engine and/or an electric motor/electric drive motor. The integrated pump, coolant flow control and heat exchange device 10 includes an integrated pump part 50 (e.g., water pump), a valve body part 20 and a heat exchange part 30.

The integrated pump part 50 includes a pump housing unit which is an integrated (e.g., molded to, bolted) component on the system having an outlet 51 so that the coolant can be returned to the electric motor and/or engine of the vehicle. For instance, the pump housing unit is integrated (e.g., molded to or with, bolted) with the housing of the heat exchange unit 30. Similarly, the valve body part 20 also is integrated (e.g., molded to, bolted) with the housing of the heat exchange unit 30. Alternatively, the integrated pump part and/or valve part is/are a separate unit(s) that is/are mechanically secured (e.g., bolted, secured by adhesives, welding) to a housing of the heat exchange part, so as to integrate the valve and/or pump parts with the integrated coolant flow control and heat exchange device and thereby form a unitary device.

For example, the housing of the heat exchange unit is configured so as to further include a mounting surface and the pump housing unit includes a complementary mounting surface so that the pump housing unit can be mechanically secured to the heat exchange unit at the mounting surface thereof. Similarly, the housing of the heat exchanger is configured so as to include a mounting surface and the housing for the valve body part includes a complementary mounting surface so that the valve body part housing can be mechanically secured to the heat exchange unit at the mounting surface thereof. Such mechanically securing includes for example, any of a number of techniques known to those skilled in the art such as bolting, welding and using adhesives.

In an illustrative embodiment the integrated pump, coolant flow control and heat exchange device 10 includes an integrated housing unit for housing each of the valve body 20, heat exchange part 30 and the pump 50. For example, a housing is molded using any of a number of materials known in the art or is formed using any of a number of materials and techniques as is know to those skilled in the art so as to form a housing unit for such a pump part 50 (or integrated pump), and coolant flow control and heat exchange device 10. Such forming can further include providing an outlet 51 whereby fluid can be returned to the electric motor and/or engine and/or providing a housing to support impeller flow and/or attachment of a pump motor/impeller assembly.

Such a pump part 50 is configurable so as to include a pump and impeller or a pump motor assembly 53. Such a pump motor assembly 53 includes an electric motor, an impeller assembly and/or a control circuit portion. As is known to those skilled in the art, the impeller assembly includes an impeller that moves (e.g., rotates, pulses) so as to pressurize the fluid being acted on by the pump and so the fluid moves in a desired direction. Such an electric motor is suitably mechanically coupled to the impeller assembly (e.g., by gearing or shaft) so that the impeller moves at a desired speed (e.g., rotates at a desired rotational speed). The control circuit portion is preferably configured and arranged to control the electric motor so that the impeller is rotated at the desired speed. In more particular embodiments, the electric motor is a variable speed motor whose speed is controlled so that the impeller is ratable at a speed within a range of values, in particular for optimizing coolant flow and power consumption.

In further embodiments, the pump housing unit 50 is further configured and arranged so as to receive and secure the pump motor assembly thereto. In an illustrative embodiment, the pump motor assembly is mechanically affixed or secured to the pump housing unit such as by bolts or using any of a number of other mechanical techniques as are known to those skilled in the art.

Figure 3:
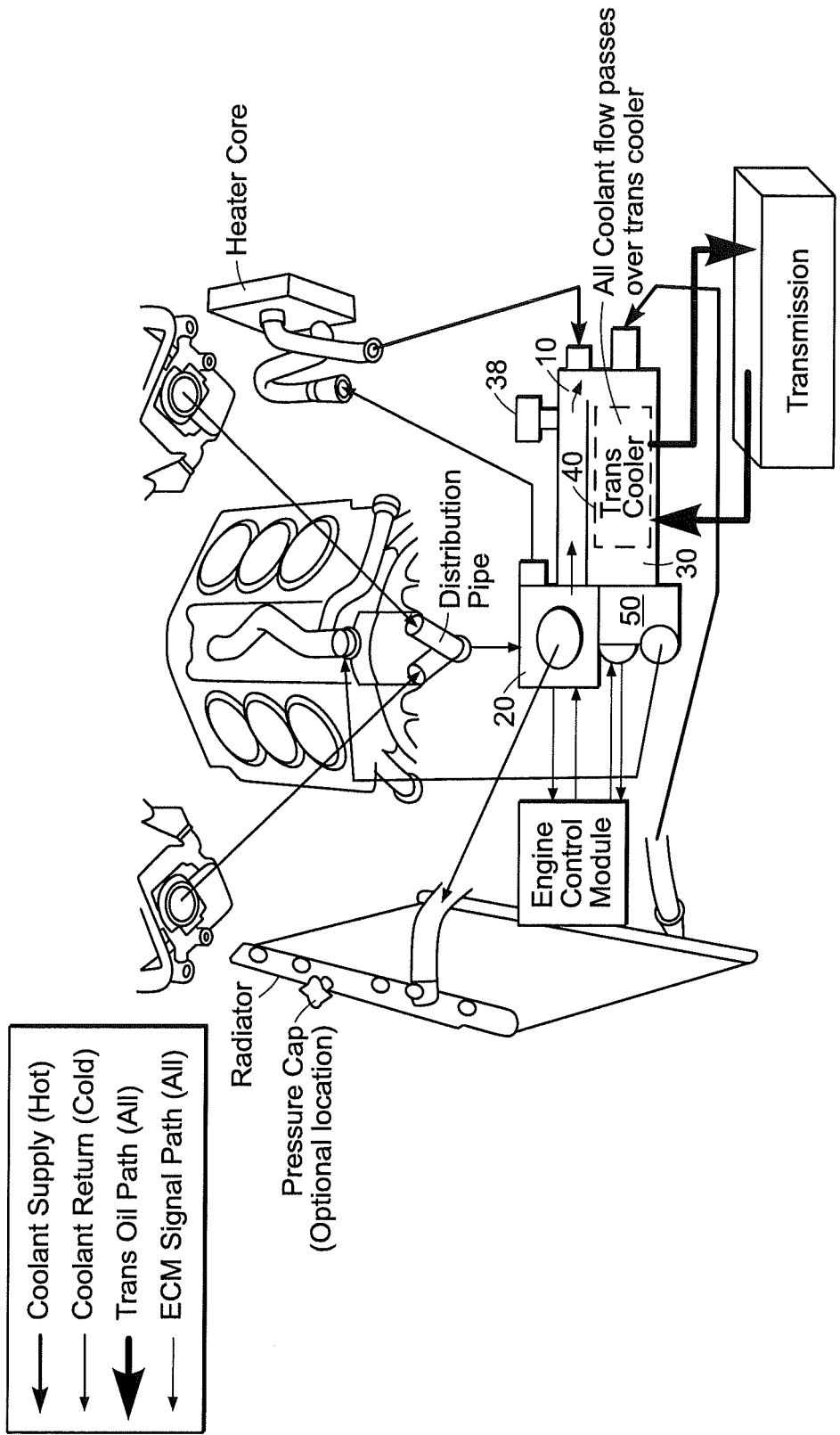
FIG. 3 is an illustrative view showing an exemplary coolant and vehicle fluid flow circuit according to a first aspect/embodiment including an integrated pump, coolant flow control and heat exchange device according to another aspect the present invention.

The valve body part 20 includes at least one inlet and at least one outlet. Preferably, as shown in FIG. 1, the valve body part includes an inlet 21, a first outlet 22, a second outlet 23, and a third outlet 24. Reference also should be made to FIG. 3 which illustrates an exemplary coolant and vehicle fluid flow circuit when using the integrated pump, coolant flow control and heat exchange device 10 of the present invention. The heat exchange part 30 includes at least one inlet and an outlet 31 that can feed coolant to the pump part 50 or integrated water pump. Preferably, the heat exchange part 30 may include multiple inlets e.g., as shown in FIG. 1, first inlet 32, second inlet 33 and third inlet 34. In further embodiments, the heat exchange part may contain a plurality of outlets.

As indicated herein, the pump part 50 or integrated water pump may suitably include an outlet 51, so that operation of the pump returns coolant to the electric motor or engine. In further embodiments, the pump part 50 may suitably include an inlet 52 that is fluidly coupled to the outlet 31 of the heat exchange part 30 so that the coolant flows from the heat exchange part to the pump part and thence to the electric motor and/or engine.

Figure 2:
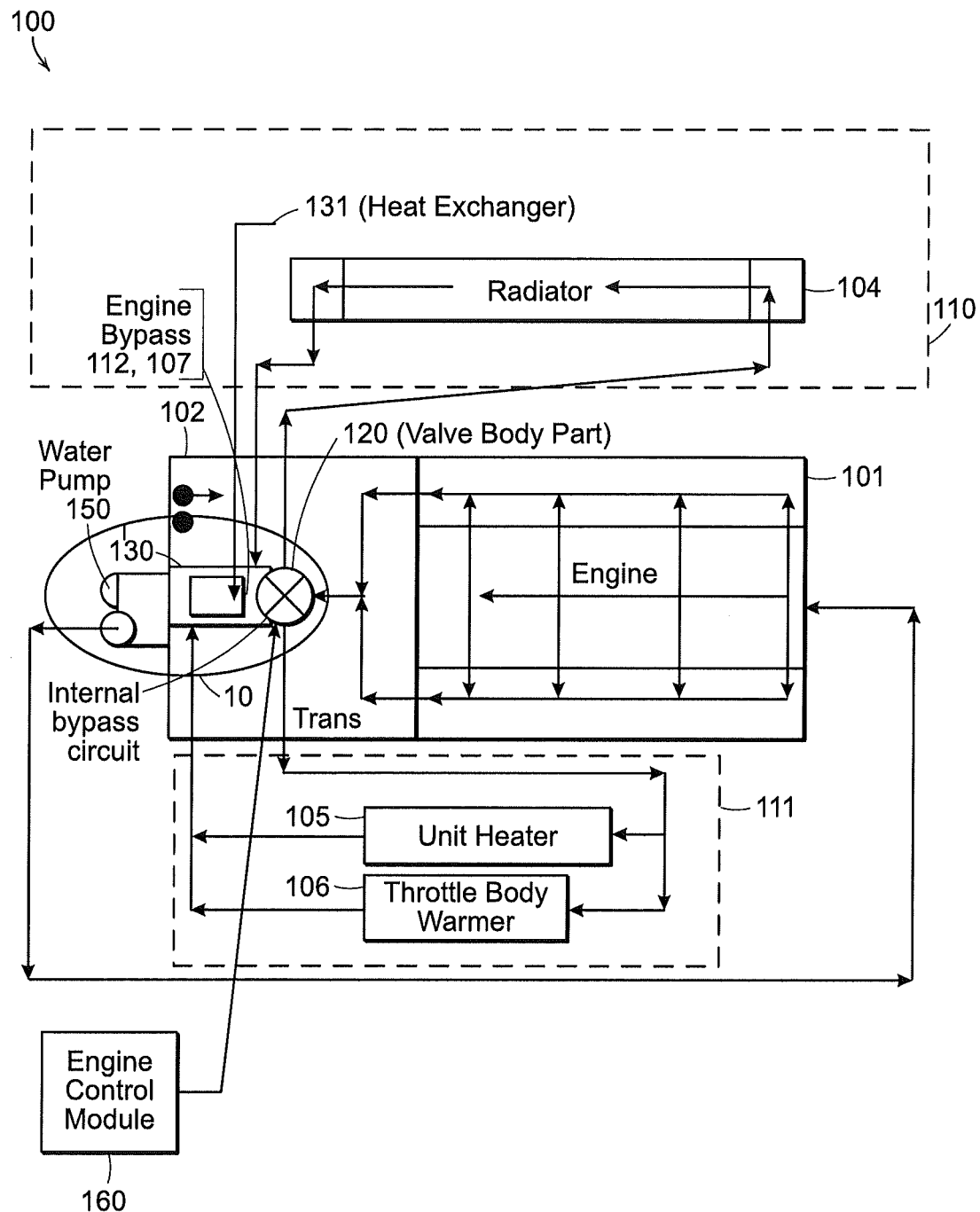
FIG. 2 shows a coolant flow control system including the device of FIG. 1.

The inlet 21 of the valve body part 20 is suitably provided to receive coolant coming from the engine/electric motor. The first outlet 22 of the valve body part 20 is provided to discharge coolant from the valve body part 20 toward the radiator. The second outlet 23 of the valve body part 20 is provided to discharge coolant from the valve body part 20 toward the unit heater 105 (FIG. 2).

The outlet 31 of the heat exchange part 30 is provided to discharge coolant from the heat exchange part 30 to the pump part 50. The first inlet 32 of the heat exchange part 30 is provided to receive coolant flowing from the radiator. The second inlet 33 of the heat exchange part 30 is provided to receive coolant coming from the unit heater 105. The third outlet 24 of the valve body part 20 is connected (i.e., mechanically and fluidly coupled) to the third inlet 34 of the heat exchange part 30, which takes the place of the traditional engine coolant bypass circuit. In other words, such operable coupling of the valve body part third outlet and the heat exchanger third inlet to each other is such that any bypass flow or the bypass flow circuit is internalized between these two components. As described further herein, in this aspect, return flow from coolant flow circuits that are external to the integrated pump, coolant flow control and heat exchange device, is split between the heat exchange part and the valve body part. The valve body part 20 controls the coolant flow so that none, some or all of the coolant can be delivered to the heat exchange part 30 to thereby warm up and cool down a vehicle fluid inside the heat exchanger 40 by heat exchange therebetween.

In further embodiments, the valve body part 20 further includes a flow wall(s) 26 (hereinafter reference to a flow wall shall be understood to include the plurality—namely flow walls) for flow control. Such a flow wall(s) 26 within the valve body part 20 functions to control the amount of coolant flowing into various system circuits. For the design shown in FIG. 1, the flow wall(s) 26 suitably may be shaped like, e.g., an inverted cup with varying opening shapes made in the cup which coincides with the different outlets. This shall not be considered limiting as it is within the scope of the present invention for the flow wall(s) to comprise any shape known in the art (e.g., flat, circular or cup shaped) that is configurable so as to control fluid flow and the amount of such flow as discussed further herein. In particular, the flow wall(s) 26 is configured so as to be capable of blocking all flow to any one or more of the outlet(s) or controlling any percent of flow up to full flow to any one or more of the outlet(s) depending on system requirements and/or engine operating condition(s). The flow amount also can be, suitably, controlled by unique controlled opening patterns located in the flow wall(s) 26 designed to meet specific system coolant flow amounts based on circuit requirements.

In further embodiments, the heat exchange part 30 further includes a (e.g., fluid to fluid) heat exchanger 40 provided within the heat exchange part 30. The heat exchanger 40 suitably includes at least one inlet and at least one outlet. Preferably, it may include an inlet 41 and an outlet 42, as generally depicted in FIG. 1. The inlet 41 is provided ideally for receiving a vehicle fluid from a supply source and the outlet 42 is provided for discharging the vehicle fluid from the heat exchanger 40 back to the supply source. Examples of the vehicle fluid include, but is/are not limited to, transmission oil, engine oil, power steering fluid, differential oil, trans axle oil, electric cooler fluid, converter oil, generator oil, a/c cabin refrigerant and/or any kind of fluids for use in any other system or device within the vehicle requiring cooling or warming such as a functionality of the motor vehicle, the engine or the electric motor. The vehicle fluid can be any type of fluids, gases or mixtures requiring cooling or heating such as oils, refrigerants, coolants or salts. Only for illustration purposes, the device 10 shown in FIG. 1 (and other drawings) is described to include transmission oil as the vehicle fluid and a transmission as the supply source.

As further indicated herein, it is within the scope of the present invention for such an integrated pump, coolant flow control and heat exchange device 10, more particularly the heat exchange part 30 thereof, to be configured so as to include a plurality or two or more of such heat exchangers 40 provided within the heat exchange part 30.

The device 10 may further include an actuator 25 on or near the valve body part 20. The actuator 25 is configured to operate, in response to a control signal from the engine control module (ECM) 160, or other control device such as a digital signal processor or a smart controller as is known to those skilled in the art and suitable for the intended purpose. For the digital signal processor or smart controller, the device/controller receive inputs representative of vehicle operational conditions and convert such inputs so as to control the operation of the wall(s) of the valve body part so as to further regulate and control flow of the coolant. More specifically, the ECM, the digital signal processor or smart controller output a signal(s) so as to selectively operate the movement of the flow wall(s) 26 which opens, varies and/or closes the flow through the outlet 22, 23, 24 of the valve body part 20 in response to respective control signals from the engine control module or the other control device. The actuator 25 can be realized in various forms as are known to those skilled in the art or hereinafter developed. One example is a step motor (e.g., an electric step motor) that is controlled by a signal received from the engine controller or the other control device which, depending on coolant and oil temperatures, controls the flow wall(s) 26 position to optimize coolant flow within the circuits.

Preferably, the device 10 further includes a pressure cap 38 on a portion of the heat exchange part 30. The pressure cap 38, similar to a traditional spring actuated pressure cap, may function as a controller of the coolant operating pressure within the system and/or as an access point in the system for adding coolant for system servicing. In yet further embodiments, such a pressure cap can be used in conjunction with an external tank or reservoir that can receive coolant being released from the heat exchanger under certain operating conditions and/or retiring coolant in the external tank back to the heat exchanger under other certain operating conditions.

The shape, size, and position of the valve body part 20 are not limited to particular ones and can be independently changed according to design choices and/or operational conditions. For instance, in an exemplary, illustrative embodiment the valve body part 20 has a circular cross section (FIG. 1).

Likewise, the position, shape and size of the inlet 21 and the first, second, and third outlets 22, 23, 24 of the valve body part 20, the outlet 31 and the first, second, and the third inlets 32, 33, 34 of the heat exchange part 30, and the inlet 41 and the outlet 42 of the heat exchanger 40, and the inlet 52 and outlet 51 of the pump part 50 are not limited to particular ones and can be independently changed according to design choices and/or operational conditions. For example, the inlets 21, 32, 33, 34, 41, 52 and the outlets 22, 23, 24, 31, 42, 51 each may have a circular cross section. Preferably, some or all of the inlets 21, 32, 33, 34, 41, 52 and the outlets 22, 23, 24, 31, 42, 51 may be designed to have identical or different shapes and sizes. Suitably, the third outlet 24, the third inlet 34, the outlet 31 and the pump part inlet 52 may be formed integrally or separately.

In addition, additional ports may be added to supply coolant to other branch coolant circuits (not shown). For example, there may be an additional outlet(s) similar to the outlet 23 which can flow coolant to other possible circuit needs (i.e., engine cooler, power steering cooler, electric cooler fluid, throttle body warmer, or any other systems or devices provided within a vehicle for cooling or warming).

The valve body part 20 may be formed integrally with the heat exchange part 30 while being in fluid communication with the heat exchange part 30. Alternatively, the valve body part 20 can be located remotely from the heat exchange part 30 while being in fluid communication with the heat exchange part 30. Also, the pump part 50 may be formed integrally with the heat exchange part 30 while being in fluid communication with the heat exchange part 30. Alternatively, the pump part 50 can be located remotely from the heat exchange part 30 while being in fluid communication with the heat exchange part 30.

Figure 6:
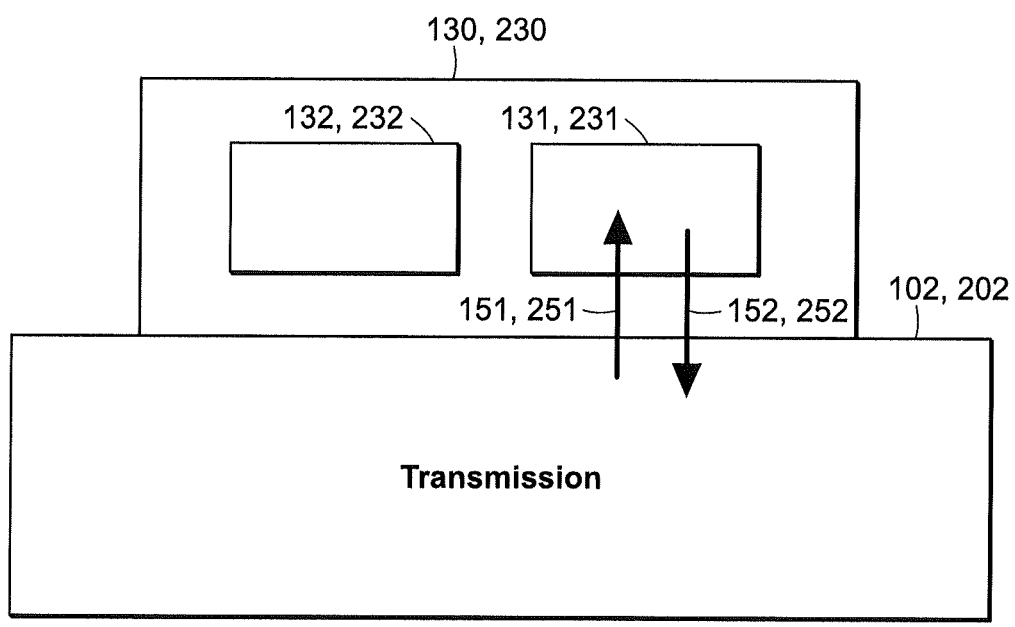
FIG. 6 is a schematic diagram of an integrated pump, coolant flow control and heat exchange device according to another embodiment of the present invention, in which the heat exchange part is mounted on a supply housing of a vehicle and which includes a plurality of heat exchangers.

Also, the heat exchange part may include a plurality of heat exchangers. For example, as shown in FIG. 6, the heat exchange part 130 may include two heat exchangers 131, 132. Further, the heat exchange part 130 may, suitably, be mounted on a predetermined portion or portions of a supply source housing 102 (e.g., transmission housing) while being in fluid communication with the supply source housing 102. Alternatively, it may be placed remotely from the supply source housing 102 while being in fluid communication with the supply source housing 102.

In an exemplary embodiment, as shown in FIG. 6, the heat exchange part 130 may be mounted on a portion of the supply source housing 102 (e.g., transmission housing). The heat exchange part 130 may have a first heat exchanger 131 and a second heat exchanger 132. In this case, although not shown, the valve body part 20 and the pump part 50 may be disposed in the above-described manner.

In this embodiment, the first heat exchanger 131 may be in fluid communication with the supply housing 102 through a first heat exchanger inlet 151 and a first heat exchanger outlet 152, which are similar to the inlet 41 and outlet 42, respectively (FIG. 1). The first heat exchanger inlet 151 and outlet 152 can be formed either in the supply source housing 102 while being in fluid communication with the first heat exchanger 131 or in the other vehicle system(s) while being in fluid communication with the first heat exchanger 131. The second heat exchanger 132 may fluid communicate with the supply source housing 102 through a second heat exchanger inlet (not shown) and a second heat exchanger outlet (not shown) which are similar to the first exchanger inlet 151 and outlet 152. Alternatively, the second heat exchanger 132 may be designed to be in fluid communication with additional vehicle systems (not shown) that need either cooling or warming As discussed above, the mounting position of the heat exchange part and the number of the heat exchangers located within the heat exchange part can be adjusted according to design choice and operational condition.

The term "vehicle fluid" used herein refers to any type of fluids for use in any systems or devices within a vehicle for cooling or warming purpose. Accordingly, vehicle fluid includes, but is not limited to, oils, refrigerants, coolants or salts and may be in the form of liquid, gas, or mixture thereof. Non-limiting examples of the fluid include a transmission oil, an engine oil, a power steering oil or fluid, a differential oil, a trans axle oil, an electric cooler fluid, a converter oil, a generator oil, and an a/c cabin refrigerant.

Referring now to FIG. 2, a coolant flow control system 100 including the integrated pump coolant flow control and heat exchange device 10 according to the first embodiment is described.

The coolant control system 100 includes an integrated pump coolant flow control and heat exchange device 10, an engine (e.g., an internal combustion engine and/or an electric motor) 101, a radiator 104, a unit heater 105, a throttle body warmer 106 and a transmission 102. Hereinafter a reference to an engine 101 shall be understood to also include an electric motor alone or in combination with an engine.

The integrated pump coolant flow control and heat exchange device 10 includes a valve body part 120 and a heat exchange part 130 in fluid communication (fluidly coupled) with the valve body part 120. As described further herein, the heat exchange part 130 also is in fluid communication with the pump part 150. The valve body part 120 is in fluid communication with the engine 101 and receives all of the coolant coming from the engine 101. The heat exchange part 130 includes a first heat exchanger 131 for receiving, accommodating and discharging a first vehicle fluid. The first vehicle fluid inside the first heat exchanger 131 is heat exchanged with the coolant inside the heat exchange part 130, thereby being able to be warmed or cooled.

The pump part 150 of the integrated pump coolant flow control and heat exchange device 10 also is fluidly coupled (in fluid communication) with the engine and/or the electric motor 101. Through such fluid coupling of the engine and the heat exchange part 130, the pump part 150 can deliver coolant that has passed through the heat exchange part 130 to the engine 101 for further removal of heat energy being generated.

The radiator 104 is provided in a first branch coolant circuit 110 and is in fluid communication with the valve body part 120 so as to receive none, some or all of the coolant coming from the valve body part 120.

The unit heater 105 and throttle body warmer 106 are provided in a second branch coolant circuit 111 and are in fluid communication with valve body part 120 so as to receive none, some or all of the coolant coming from the valve body part 120.

The engine bypass 107 is in a third branch coolant circuit 112 and in fluid communication between the valve body part 120 and the heat exchange part 130 so as to receive none, some or all of the coolant coming from the valve body part 120. The third branch circuit 112 can either be formed integrally between the valve body part 120 and heat exchange part 130 or be formed separately with a communication device.

As described herein and with reference also to structure of the integrated pump coolant flow control and heat exchange device 10 shown in FIG. 1, in more particular embodiments, the valve body part 120 preferably includes an inlet 21, a first outlet 22, a second outlet 23, and a third outlet 24 and the heat exchange part 130 includes at least one inlet and one outlet and preferably includes a first inlet 32, second inlet 33 and third inlet 34 and an outlet 31 to the pump part 150. The pump part 150 includes an inlet 52 and an outlet 51.

In the illustrative embodiment shown in FIG. 2, the inlet 52 of the pump part 150 is fluidly coupled to the outlet 31 of the heat exchange part 130 and the outlet 51 of the pump part 150 is fluidly coupled to fluid inlet(s) of the engine and/or the electric motor 101. In addition, the inlet 21 of the valve body part 120 is fluidly coupled to the engine and/or electric motor 101 so to receive coolant coming from the engine/electric motor 101. As also illustrated in FIG. 2, the pump part outlet 51 and the valve body part inlet 21 are fluidly coupled to the engine and/or the electric motor 101 by interconnecting tubing, piping or other mechanisms as is know to those skilled in the art.

The first inlet 32 of the heat exchange part 130 is fluidly coupled one end of the first branch coolant circuit 110 to receive coolant flowing from the radiator 104 and the other end of the first branch circuit is fluidly coupled to the first outlet 22 of the valve body part 20 so that coolant is discharged from the valve body part 120 toward the radiator.

In the illustrated embodiment, the second inlet 33 of the heat exchange part 130 is fluidly coupled to one end of the second branch coolant circuit 111 to receive coolant flowing from the heater core or unit heater 105 and/or the throttle body warmer 106 and the other end of the second branch coolant circuit is fluidly coupled to the second outlet 23 of the valve body part 120 so that coolant is discharged from the valve body part 20 toward the unit heater and/or throttle body warmer. More particularly and as illustrated in FIG. 2, the second branch coolant circuit 111 is configured so as to include two parallel flow paths that connect to each other, where one of the unit heater 105 and the throttle body warmer 106 is located in one parallel flow path and the other of the unit heater and the throttle body warmer is located in the other parallel flow path.

It should be recognized that in an alternative embodiments the second branch coolant circuit 111 is configurable so to include one of the unit heater 105 and/or the throttle body warmer 106. In yet further alternative embodiments, the flow circuitry is configured so as to include another branch coolant flow circuit and where one of the unit heater 105 and the throttle body warmer 106 is located in the second branch coolant circuit 111 and the other of the unit heater and the throttle body warmer is located in the other branch coolant flow circuit. In such an alternative embodiment, the heat exchanger part 130 and the valve body part 120 also are configurable so as to further include an additional inlet/outlet respectively.

As described above, the third outlet 24 of the valve body part 120 can be connected (i.e., mechanically and fluidly coupled) to the third inlet 34 of the heat exchange part 130, so as to take the place of the traditional engine coolant bypass circuit. In other words, such operable coupling of the valve body part third outlet and the heat exchanger third inlet operably to each other is such that any bypass flow or the bypass flow circuit is internalized between these two components.

As described herein, return flow from the coolant flow circuits that are external to the integrated pump, coolant flow control and heat exchange device, is split between the heat exchange part 130 and the valve body part 120. The valve body part 120 controls the coolant flow so that none, some or all of the coolant can be delivered to the heat exchange part 130 to thereby warm up and cool down a vehicle fluid inside the heat exchanger 40 by heat exchange therebetween.

As indicated herein, although the valve body part 120, the pump part 150 are shown as being integrated with the heat exchange part, this is not limiting. Alternatively, the valve body part 120 is locatable remote from the heat exchange part 130 while being in fluid communication with the heat exchange part 130. Also, alternatively, the pump part 150 is locatable remote from the heat exchange part 130 while being in fluid communication with the heat exchange part 130.

The following more particularly describes the flow of the coolant through the branch circuits and functionalities connected thereto as shown in FIG. 2. The coolant passing through the first branch coolant circuit 110 is delivered back to the pump part 150 after passing through the heat exchange part 130. The coolant passing through the second branch coolant circuit 111 is delivered back to the pump part 150 after passing through the heat exchange part 130. The coolant passing through the third branch coolant circuit 112 is delivered back to the pump part 150 after passing through the heat exchange part 130. The number of the branch coolant circuits 110, 111, 112 being provided and also controlled by the device 10 can be adjusted as long as packaging space permits and proper function is ensured and/or depending on design choice.

Preferably, the system may further include additional branch coolant circuit(s) that can flow a fluid(s) to and from other possible supply source(s) requiring cooling and/or warming depending on cooling system design and requirements. The coolant flow would be controlled through the branch coolant circuits by the valve body part 120 of the device 10.

Suitably, the system may further include additional heat exchanger(s). Preferably, the heat exchanger(s) may be connected in parallel or series with existing circuits like the throttle body 106 connected to the unit heater 105, may be connected in parallel or series with at least one of the branch coolant circuits 110, 111, 112, or may have its own independent branch circuit but deliver the coolant back to the pump part 150 after passing through the heat exchange part 130.

As discussed above and as shown in FIG. 6, the heat exchange part 130 may further include a second heat exchanger 132 for receiving, accommodating and discharging a second vehicle fluid. The second vehicle fluid inside the second heat exchanger 132 is heat exchanged with the coolant inside the heat exchange part 130, thereby being able to be warmed or cooled. The second vehicle fluid may be identical to or different from the first vehicle fluid. The second vehicle fluid can be any type of vehicle fluid for use in systems or devices within a vehicle for cooling or warming purpose. Examples of the second vehicle fluid include, but is not limited to, a transmission oil, an engine oil, or a power steering oil, a differential oil, a trans axle oil, an electric cooler fluid, a converter oil, a generator oil, or an a/c cabin refrigerant.

As discussed above, the first heat exchanger 131 can be positioned on a portion of the supply source housing (e.g., transmission housing) 102, in which case the fluid path would require no additional connecting hardware.

Figure 4:
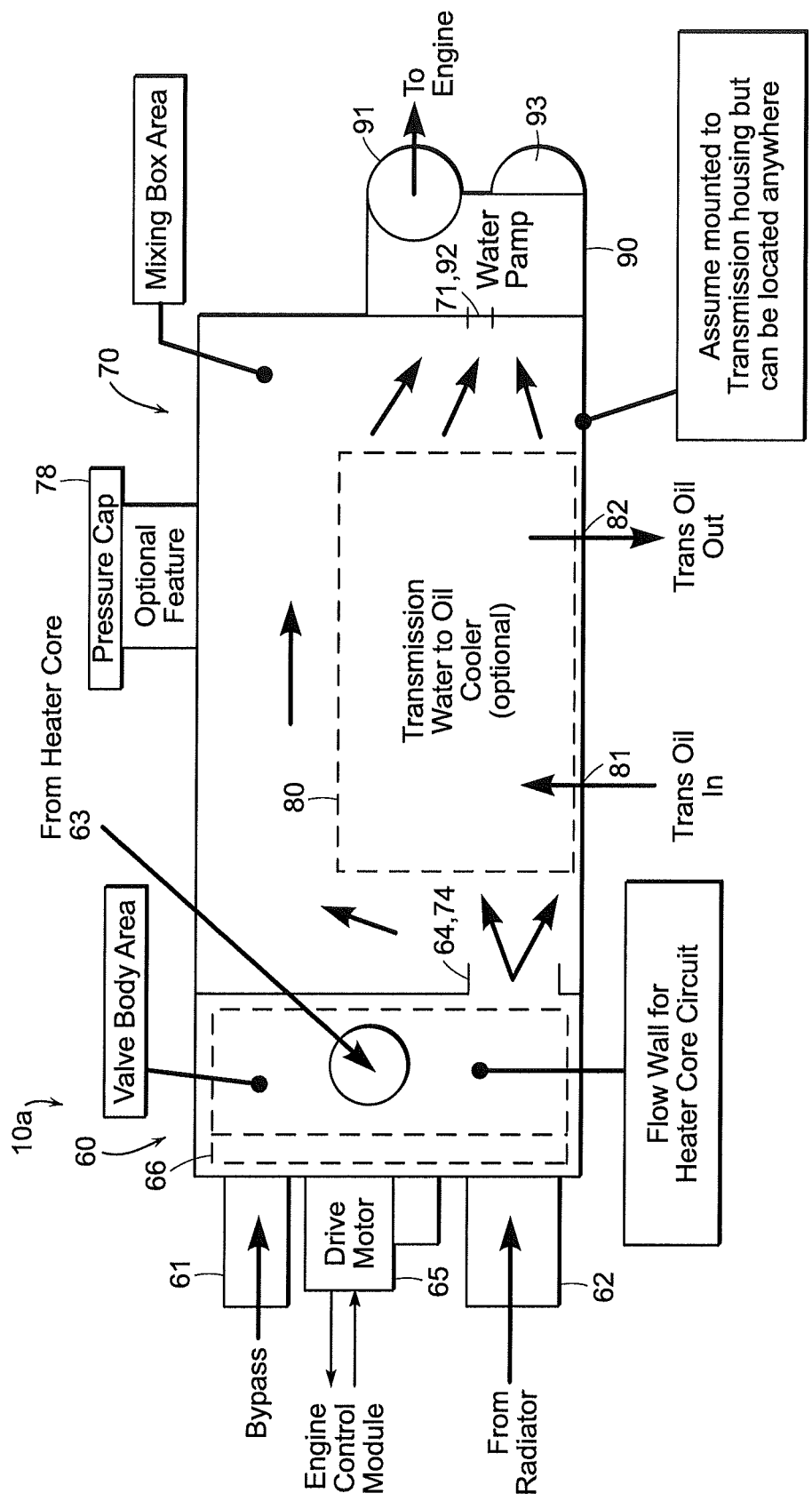
FIG. 4 is an illustrative view showing an integrated pump, coolant flow control and heat exchange device according to a second aspect/embodiment of the present invention.
Figure 5:
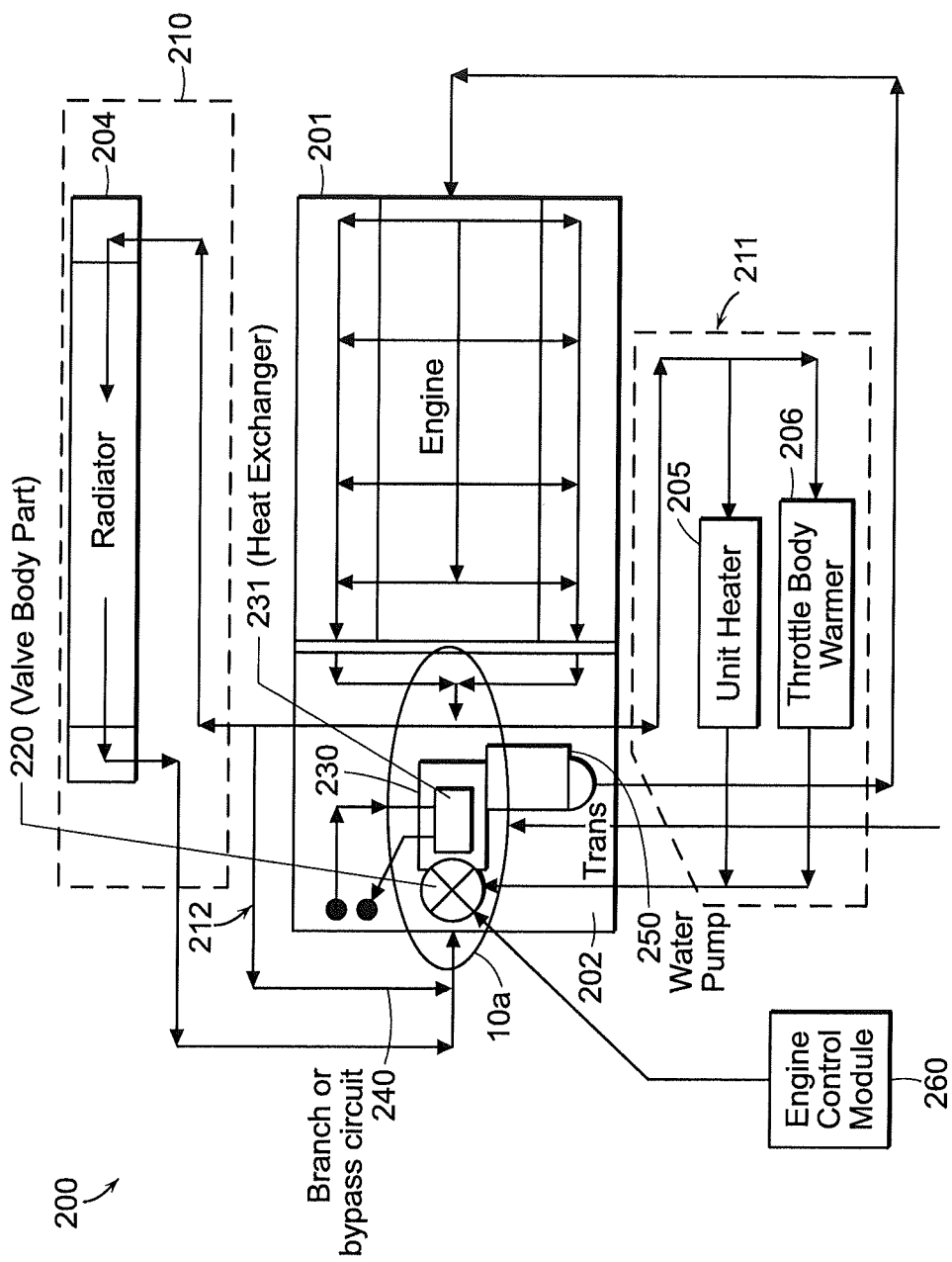
FIG. 5 shows a coolant flow control system according to a second aspect of the present invention including the device of FIG. 4.

Referring now to FIG. 4 there is shown an integrated pump, coolant flow control and heat exchange device 10a for a vehicle according to another or second aspect or embodiment of the present invention. Such a vehicle suitably includes an internal combustion engine and/or an electric motor, a transmission, a unit heater, a radiator, and an engine control module (see FIG. 5). It should be understood that if the following discussion refers to coolant being returned to or flowing through the engine or an internal combustion engine, this is not limiting to the particular embodiment. It shall be understood that a reference to an/the engine also includes coolant flowing and being returned to the engine and/or an electric motor/electric drive motor. Such an integrated pump, coolant flow control and heat exchange device 10a includes a valve body part 60, a heat exchange part 70 and a pump body part 90 or integrated pump. Reference also should be made to FIG. 5, which shows a coolant flow control system that includes the integrated pump, coolant flow control and heat exchange device 10a of FIG. 4.

Reference shall be made to the discussion above regarding the integrated pump, coolant flow control and heat exchange device 10 according to a first aspect/embodiment of the present invention and the functionalities thereof for details of the integrated pump, coolant flow control and heat exchange device 10a according to this second aspect/embodiment of the present invention and the functionalities thereof, except as otherwise described in the following. In particular, reference shall be made to the foregoing discussion as to the integration/interconnection of the valve body part and the pump part with the heat exchange part and the configuration of the pump part.

For the integrated pump, coolant flow control and heat exchange device 10a according to this second aspect/embodiment of the present invention and as shown in FIG. 4, the valve body part 60 is located upstream of the heat exchange part 70 and is downstream of all other branch coolant circuits within the system such that the coolant leaving the engine flows through all branch coolant circuits before entering the valve body part 60. In addition, the heat exchange part 70 is located upstream of the pump part 90, which pump part also is upstream of the engine and/or electric motor 201.

In addition and as more clearly shown in FIG. 5, an external branch coolant circuit 240 is provided that is fluidly coupled to an inlet 61 of the valve body part 60, 220 and to the engine and/or electric motor 201. This branch circuit 240 and the inlet pipe (i.e., first inlet 61), provides for the engine bypass flow (if needed). As with the above-described integrated pump, coolant flow control and heat exchange device 10 according to the first aspect/embodiment, all the branch coolant circuits are pressurized by the pump part 90, 250, whenever the pump part is operational or running.

The valve body part 60, 220 suitably includes at least one inlet and at least one outlet. Preferably and as shown in FIG. 4, the valve body part 60 includes a first inlet 61, a second inlet 62, a third inlet 63, and an outlet 64. The heat exchange part 70, 230 includes at least one inlet and at least one outlet. Preferably, the heat exchange part includes an outlet 71 and a first inlet 74.

The first inlet 61 of the valve body part 60 is provided for receiving coolant coming from the engine 201. The second inlet 62 of the valve body part 60 is provided for receiving coolant coming from the radiator 204 or branch circuit 210. The third inlet 63 of the valve body part 60 is provided for receiving coolant coming from the unit heater 205 and/or the throttle body warmer 206 or branch circuit 211. The outlet 71 of the heat exchange part 70 is provided for discharging all the coolant from the heat exchange part 70 to or towards the pump part 90 or the integrated pump.

The first inlet 74 of the heat exchange part 70 is provided to receive all the coolant coming from the valve body part 60. The outlet 64 of the valve body part 60 is connected (fluidly coupled) to the inlet 74 of the heat exchange part 70 so that all of the coolant inside the valve body part 60 is delivered to the heat exchange part 70 to thereby warm up and cool down the supply source fluid (e.g., transmission oil) inside the heat exchanger 80 by heat exchange therebetween.

In further embodiments, the valve body part 60 is configured so as to further includes a flow wall(s) 66. As further described herein, the flow wall(s) 66 functions to control the amount of coolant flowing from various system circuits (hereinafter reference to a flow wall shall be understood to include a plurality—namely flow walls). The flow wall(s) 66 may be shaped like, e.g., an inverted cup with varying opening shapes made in the cup which coincides with the different inlets. This shall not be considered limiting as it is within the scope of the present invention for the flow wall to comprise any shape known in the art (e.g., flat, circular or cup shaped) that is configurable so as to control fluid flow and the amount of such flow as discussed further herein. In particular, the flow wall(s) 66 is capable of blocking all flow from any one or more of the inlets or controlling any percent of flow up to full flow through any one or more of the inlets depending on system requirements. The flow amount also can be suitably, controlled by the unique controlled opening patterns located in the flow wall(s) designed to meet specific system coolant flow amounts based on circuit requirements.

The heat exchange part 70 suitably further includes a heat exchanger 80 provided inside the heat exchange part 70. The heat exchanger 80 includes at least one inlet and at least one outlet. Preferably, it may include an inlet 81 and an outlet 82, as shown in FIG. 4. The inlet 81 is provided for receiving a vehicle fluid (e.g., transmission oil) from a supply source (e.g., transmission 102, 202) and the outlet 82 is provided for discharging the vehicle fluid from the heat exchanger 80 toward the supply source, by which the heat exchanger 80 is in fluid communication with the supply source.

Such a pump part 90 includes a pump housing unit which is an integrated (e.g., molded to, bolted) component on the system having an outlet 91 so that the coolant can be returned to the electric motor and/or engine 201 of the vehicle. In an illustrative embodiment the integrated pump, coolant flow control and heat exchange device 10a includes an integrated housing unit for housing each of the valve body 70, heat exchange part 60 and the pump 90, whereby the outlet 91 is provided in the housing whereby fluid can be returned to the electric motor and/or engine 201.

As also indicated herein, such a pump part 90 also includes a pump 93 or pump motor assembly. Such a pump 93 includes an electric motor, an impeller assembly and control circuit portion. As is known to those skilled in the art, the impeller assembly includes an impeller that moves (e.g., rotates, pulses) so as to pressurize the fluid being acted on by the pump and so the fluid moves in a desired direction. Such an electric motor is suitably mechanically coupled to the impeller assembly (e.g., by gearing or a shaft) so that the impeller moves at a desired speed (e.g., rotates at a desired rotational speed). The control circuit portion is preferably configured and arranged to control the electric motor so that the impeller is rotated at the desired speed. In more particular embodiments, the electric motor is a variable speed motor whose speed can be controlled so that the impeller is ratable at a speed within a range of values, in particular for optimizing coolant flow and power consumption.

In further embodiments, the pump housing unit 50 is further configured and arranged so as to receive and secure the pump motor assembly thereto. In an illustrative embodiment, the pump motor assembly is mechanically affixed or secured to the pump housing unit such as by bolts or using any of a number of other mechanical techniques as are known to those skilled in the art.

As indicated herein, reference shall be made to the discussion concerning the integrated pump, coolant flow control and heat exchange device 10 above for other details of the pump part 90 not expressly provided here.

The integrated pump, coolant flow control and heat exchange device 10a, suitably further includes an actuator 65 on or near the valve body part 60. The actuator 65 is configured to operate in response to a control signal from the engine control module (ECM 260 or other control device such as a digital signal processor or a smart controller as is known to those skilled in the art and suitable for the intended purpose. For the digital signal processor or smart controller, the device/controller receive inputs representative of vehicle operational conditions and convert such inputs so as to control the operation of the wall(s) of the valve body part so as to further regulate and control flow of the coolant. More specifically, the ECM, the digital signal processor or smart controller output a signal(s) so as to selectively operate the movement of the flow wall(s) 66 within the valve body part 60 in response to the control signals from the engine control module or the other control device. The actuator 65 can be realized in various forms as are known those skilled in art or hereinafter developed. One example is a step motor, such as that described herein, that is controlled by a signal received from the engine controller or the other control device which, depending on coolant and oil temperatures, can control the flow wall(s) 66 position to optimize coolant flow within the various circuits.

Preferably, the integrated pump, coolant flow control and heat exchange device 10*a* further includes a pressure cap 78 on a portion of the heat exchange part 70. As discussed above, the pressure cap 78, like the pressure cap 38, may function as a controller of the coolant operating pressure within the system and/or as an access point in the system for adding coolant for system servicing. As indicated herein, in yet further embodiments such a pressure cap 78 can be used in conjunction with an external tank or reservoir that can receive coolant being released from the heat exchanger under certain operating conditions and/or returning coolant in the external tank back to the heat exchanger under other certain operating conditions.

The shape, size, and position of the valve body part 60 are not limited to particular shape, size, and location and can be adjusted according to design choices and/or operational conditions. For instance, in an exemplary embodiment the vertical direction cross section of the valve body part 60 may be circular such that the flow wall 66 can rotate within the valve body part 60 and control the flow amount within the various branch coolant circuits.

Likewise, the position, shape and size of the inlets 61, 62, 63 and the outlet 64 of the valve body part 60, the outlet 71 and the first inlet 74 of the heat exchange part 70, and the inlet 81, the outlet 82 of the heat exchanger 80 and the inlet 92 and outlet 91 of the pump part 90 are not limited to particular ones and can be independently adjusted according to e.g., operational conditions. For example, the inlets 61, 62, 63, 74, 81, 92 and the outlets 64, 71, 82, 91 each may have a circular cross section. Preferably, some or all of the inlets 61, 62, 63, 74, 81, 92 and the outlets 64, 71, 82, 91 may be designed to have identical or different shapes and sizes. Suitably, the outlet 64,71 and the inlet 74, 92 may be formed integrally or separately. For example, the entire valve body part 60 can be integrated together with the heat exchange part 70 as one integral part with no wall separating the two parts. As indicated herein, the valve body part 60 and the pump part 90 may be formed integrally with the heat exchange part 70 while being in fluid communication with the heat exchange part. Alternatively, the valve body part 60 and/or the pump part 90 can be located remotely from the heat exchange part 70 while being in fluid communication with the heat exchange part 70.

Further, additional ports may be added to receive coolant from other branch coolant circuits (not shown). For example, there may be an additional inlet(s) similar to the inlet 63 which can receive coolant from other possible branch coolant circuits.

Also, the heat exchange part may include a plurality of heat exchangers. For example, as shown in FIG. 6, the heat exchange part 230 may include two heat exchangers 231, 232.

Further, the heat exchange part 70, 230 may, suitably, be mounted on a predetermined portion or portions of a supply source housing 202 (e.g., transmission housing) while being in fluid communication with the supply source housing 202. Alternatively, it may be placed remotely from the supply source housing 202 while being in fluid communication with the supply source housing 202.

In an exemplary embodiment and as shown in FIG. 6, the heat exchange part 230 may be mounted on a portion of the supply source housing 202 (e.g., transmission housing). The heat exchange part 230 may have a first heat exchanger 231 and a second heat exchanger 232. In this case, although not shown, the valve body part 60 and/or the pump part 90 may be disposed in the above-described manner.

In this embodiment, the first heat exchanger 231 is in fluid communication with the supply housing 202 through a first heat exchanger inlet 251 and a first heat exchanger outlet 252, which are similar to the inlet 81 and outlet 82, respectively. The first heat exchanger inlet 251 and outlet 252 can be formed either in the supply source housing 202 while being in fluid communication with the first heat exchanger 231 or with other vehicle system(s) while being in fluid communication with the first heat exchanger 231. The second heat exchanger 232 may be in fluid communication with the supply source housing 202 through a second heat exchanger inlet (not shown) and a second heat exchanger outlet (not shown) which are similar to the first exchanger inlet 251 and outlet 252. Alternatively, the second heat exchanger 232 may be designed to be in fluid communication with additional vehicle systems (not shown) that need either cooling or warming As discussed above, the mounting position of the heat exchange part and the number of the heat exchangers located within the heat exchange part can be adjusted according to e.g., operational condition.

Referring to FIG. 5, there is shown a coolant flow control system 200 for a vehicle including the integrated pump coolant flow control and heat exchange device 10*a* as described herein. The coolant flow control system 200 suitably includes an integrated pump coolant flow control and heat exchange device 10*a*, an engine (e.g., an internal combustion engine) and/or electric motor 201, a transmission 202, a radiator 204, a unit heater 205, a throttle body warmer 206 and an engine control module 260. Hereinafter, a reference to an engine 201 shall be understood to also include an electric motor alone or in combination with an engine.

The integrated pump coolant flow control and heat exchange device 10*a* includes a valve body part 220 and a heat exchange part 230 in fluid communication with the valve body part 220 and a pump part 250 which is in fluid communication with the heat exchange part 230. As indicated herein, the pump part 250 is arranged so that it draws coolant through the valve body part 220 and thence through the heat exchange part 230 into the pump part 250 for delivery to the engine and/or electric motor 201. The heat exchanger part 230 suitably includes therein a first heat exchanger 231 for receiving, accommodating and discharging a first vehicle fluid. The first vehicle fluid inside the first heat exchanger 231 is heat exchanged with the coolant inside the heat exchange part 230, thereby being able to be warmed or cooled.

The pump part 250 is in fluid communication with the heat exchanger part 230 and accepts fluid/coolant from the heat exchanger part and then delivers the coolant to the engine and/or electric motor 201.

The radiator 204 is suitably provided in a first branch coolant circuit 210 and is in fluid communication with the engine 201 so as to receive some or all of the coolant coming from the engine 201. In this case, coolant is supplied to the radiator and pressurized by the engine during all operational modes, however, fluid flow depends on whether the valve body part opens the related circuit. This is true for all of the other branch circuits of this aspect/embodiments of the present invention.

The unit heater 205 is provided in a second branch coolant circuit 211 and is in fluid communication with the engine 201 so as to receive some or all of the coolant coming from the engine.

The engine bypass 240 is suitably provided in a third branch coolant circuit 212 and is in fluid communication with the engine 201 so as to receive some or all of the coolant coming from the engine.

As described herein and with reference also to structure of the integrated pump coolant flow control and heat exchange device 10a shown in FIG. 4, in more particular embodiments, the valve body part 220 preferably includes an outlet 64, a first inlet 61, a second inlet 62, and a third inlet 63 and the heat exchange part 230 includes an inlet 74 and an outlet 71 to the pump part 250. The pump part 250 includes an inlet 92 and an outlet 91.

In the illustrative embodiment shown in FIG. 5, the inlet 92 of the pump part 250 is fluidly coupled to the outlet 71 of the heat exchange part 230 and the outlet 91 of the pump part 250 is fluidly coupled to fluid inlet(s) of the engine and/or the electric motor 201. As also illustrated in FIG. 5, the pump part outlet 91 is fluidly coupled to the engine and/or the electric motor 201 by interconnecting tubing, piping or other mechanisms as is know to those skilled in the art.

As indicated herein, the integrated pump, coolant flow control and heat exchange device 10a according to a second aspect/embodiment of the present invention is configured so that coolant leaving the engine can flow through all branch coolant circuits before entering the valve body part 60, 220. In the case of the external branch circuit 240, the first inlet 61 of the valve body part 220 is fluidly coupled to one end of the external branch circuit and the other end of the external branch circuit is fluidly coupled to the engine and/or electric motor 201.

In the case of the first branch coolant circuit 210 in which is located the radiator 204, one end of the first branch circuit is fluidly coupled to the engine 201 so that coolant flows through the radiator and the other end of the first branch circuit is fluidly coupled to the second inlet 62 of the valve body part 220 so that coolant is discharged from radiator to/towards the valve body part 220. In the case of the third branch circuit 211, in which is located the heater core or unit heater 205 and/or the throttle body warmer 206, one end of the third branch circuit is fluidly coupled to the engine 201 so that coolant flows through the unit heater and/or the throttle body warmer and the other end of the third branch circuit is fluidly coupled to the third inlet 63 of the valve body part 220 so that coolant is discharged from radiator to/towards the valve body part 220. In the illustrated embodiment, the outlet 64 of the valve body part is fluidly coupled to the inlet 74 of the heat exchange part 230. In this way, all of the coolant returning to the valve body part 220 is communicated to the heat exchanger part 230.

The following more particularly, describes the flow of the coolant through the branch circuits and functionalities connected thereto as shown in FIG. 5. All the coolant passing through the first branch coolant circuit 210 is delivered back to the engine 201 after passing through the valve body part 220 and then the heat exchange part 230 and then the pump part 250. All the coolant passing through the second branch coolant circuit 211 suitably is delivered back to the engine 201 after passing through the valve body part 220 and then the heat exchange part 230 and the pump part 250. All the coolant passing through the third branch coolant circuit 212 is suitably delivered back to the engine 201 after passing through the valve body part 220 and then the heat exchange part 230 and then the pump part 250. This would also be true for any other additional branch coolant circuits that may be part of an engine cooling system.

In further embodiments of the present invention, such integrated pump, coolant flow control and heat exchange systems 100, 200 and integrated pump coolant flow control and heat exchange devices 10, 10a of the present invention further include one or more, more particularly at least one, additional branch coolant circuit(s) that can flow a fluid(s) to and from other possible supply source(s) requiring cooling or warming depending on cooling system design and requirements.

Suitably, such integrated pump coolant flow control and heat exchange systems 100, 200 and integrated pump coolant flow control and heat exchange devices 10, 10a of the present invention, further include additional heat exchanger(s). Preferably, the additional heat exchanger(s) may be connected in parallel or series with existing circuits like the throttle body 106, 206 connected to the unit heater 105, 205, may be connected in parallel or series with at least one of the branch coolant circuits 210, 211, 212, or may have its own independent branch circuit but deliver the coolant back to the engine 201 after passing through the valve body part 220 and the heat exchange part (230) and the pump part 250.

It also should be recognized that it is within the scope of the present invention to control and configure the integrated pump coolant flow control and heat exchange devices 10, 10a herein described so to provide a maximum cooling capability. In such a case, the devices are controlled so as to shut-off flow to all branches except for the branch circuit containing the radiator 104, 204, thereby achieving maximum cooling for the engine while minimizing power to the pump part 150, 250.

As discussed above and as shown in FIG. 6, the heat exchange part 230 may further include a second heat exchanger 232 for receiving, accommodating and discharging a second vehicle fluid. The second vehicle fluid inside the second heat exchanger 232 is heat exchanged with the coolant inside the heat exchange part 230, thereby being able to be warmed or cooled. The second vehicle fluid may be identical to or different from the first vehicle fluid. The second vehicle fluid can be any type of vehicle fluid for use in systems or devices within a vehicle for cooling or warming purpose. Examples of the second vehicle fluid include, but are not limited to, a transmission oil, an engine oil, or a power steering oil or fluid, a differential oil, a trans axle oil, an electric cooler fluid, a converter oil, a generator oil, and/or an a/c cabin refrigerant.

As discussed above, the first heat exchanger 231 can be positioned on a portion of the supply source housing (e.g., transmission housing) 202, in which case the fluid path would require no additional connecting hardware.

According to the coolant flow control system 100, 200, the fluid (transmission oil) can be warmed or cooled quickly. More particularly, in the case of warm up mode, all the coolant from all cooling branch circuits 110, 111, 112, 210, 211, 212 which is warmer than the supply source fluid (transmission oil), is controlled to pass over the heat exchanger 131, 231 before returning to the engine 101, 201, thereby warming the supply source fluid (transmission oil) with the waste heat produced from other vehicle areas. In addition to the quick warming, it can maintain the average supply source fluid (transmission oil) temperature higher during cold weather driving with less supply source fluid (transmission oil) temperature variation, thus improving fuel economy due to the improvements in oil lubricity within the supply source device (transmission) and seal durability as would be the same for any other heat exchangers located within the heat exchange part 130, 230.

On the other hand, in case of cooling mode, all the coolant from the engine, which is cooler than the supply source fluid (transmission oil), is controlled to pass over the heat exchanger 131, 231 before returning to the engine 101, 201, thereby cooling the supply source fluid (transmission oil). In addition to the quick cooling, it can maintain the average supply source fluid (transmission oil) temperature near the optimum temperature or within the permissible temperature, thus improving fuel economy due to the improvements in oil lubricity within the transmission and seal durability. This would apply as well for other heat exchangers located within the heat exchange part 130, 230.

In addition to the above-discussed valve body coolant control features, the valve body part 20, 60 achieved by controlling the positioning of the flow wall(s) 26, 66 within the valve body 20, 60 can provide one or more of the following features:

1) Rapid Engine Warm-Up Mode: In this fully blocked mode, the flow wall(s) (26, 66) can be positioned within the valve body 20, 60 so as to allow no coolant flow within any circuit or the engine. This condition is desired on cold engine start up where all heat generated within the engine is used to rapidly warm up the coolant and improve cold start fuel economy.

2) Default/Service Fill Mode: In the Default/Service Fill mode, at the position at which the flow wall 26, 66 is located when the actuator 25, 65 loses the signal from the engine control module or the ignition key is rotated to off, the flow wall(s) 26, 66 will reach a position which will allow flow through all branches of the coolant flow control system and protect the vehicle from overheating during operation and improve service draining and filling process during vehicle servicing.

Another unique feature of the integrated pump coolant flow control and heat exchange devices 10, 10a is that any coolant flow in any of the coolant branch circuits must pass through the heat exchange part 130, 230 and then by the heat exchanger(s) before returning to the pump part 150, 250 before returning to the engine 101, 201, thereby maximizing the heat exchange performance.

According to the present devices and systems, the vehicle fluid (e.g., transmission oil) can be warmed up or cooled down quickly. Also, with the integrated design of the present invention, space utilization can be improved and the number of components consisting of the system can be reduced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An integrated pump coolant flow control and heat exchange device for a vehicle, the device comprising:
   (a) a pump for delivering engine coolant to an engine;
   (b) a heat exchange part which discharges the coolant from the heat exchange part toward the pump; and
   (c) a coolant flow control unit,
   wherein the pump and heat exchange part form an integrated unit, and
   the heat exchange part comprises an outlet for discharging coolant from the heat exchange part towards the pump, a first inlet for receiving a coolant coming from a radiator, a second inlet for receiving a coolant coming from a unit heater, and a third inlet for receiving coolant from a bypass circuit, and a heat exchanger provided inside the heat exchange part, the heat exchanger including an inlet for receiving from a source of supply a vehicle fluid and an outlet for discharging the vehicle fluid from the heat exchanger toward the supply source by which the heat exchanger is in fluid communication with the supply source.

2. of claim 1 wherein the device is coupled with an electric motor.

3. The device of claim 1 wherein the device is coupled with a hybrid engine system including an engine and an electric motor.

4. The device of claim 1 wherein the device further comprises a valve body part that comprises an inlet for receiving a coolant coming from the engine, a first outlet for discharging a coolant from the valve body part toward the radiator, and a second outlet for discharging a coolant from the valve body part toward the unit heater,
   wherein the valve body part further includes a third outlet, the heat exchange part further comprises a third inlet, and the third outlet of the valve body part is connected to the third inlet of the heat exchange part thereby making the valve body part and the heat exchange part in fluid communication with each other which functions as the engine bypass so that none, some or all of the coolant inside the valve body part can be delivered to the heat exchange part to warm up and cool down the vehicle fluid inside the heat exchanger by heat exchange therebetween.

5. A vehicle system comprising an engine system and a device of claim 1.

6. The vehicle system of claim 5 wherein the engine system comprises an electric motor.

7. The vehicle system of claim 5, wherein the engine system comprises a hybrid engine system including an engine and an electric motor.

8. The vehicle system of claim 5 wherein the engine system comprises an internal combustion engine.

9. The vehicle system of claim 5 wherein the vehicle system comprises (1) an internal combustion engine and/or an electric motor, (2) a transmission, (3) a unit heater, (4) a radiator, and (5) an engine control module.

10. The vehicle system of claim 5 wherein the vehicle system comprises (1) an internal combustion engine and an electric motor, (2) a transmission, (3) a unit heater, (4) a radiator, and (5) an engine control module.

11. A coolant flow control system for a vehicle, comprising:
   an engine;
   an integrated pump coolant flow control and heat exchange device including a valve body part, a pump part and a heat exchange part;
   wherein the pump part is in fluid communication with the heat exchanger part, the heat exchanger part is in fluid communication with the valve body part, the valve body part is in fluid communication with the engine so as to receive all of the coolant coming from the engine, and a pump part in fluid communication with the heat exchange part, the pump part delivering a coolant to the engine;
   a radiator provided in a first branch coolant circuit and being in fluid communication with the valve body part so as to receive none, some or all of the coolant coming from the valve body part;
   a unit heater provided in a second branch coolant circuit and being in fluid communication with valve body part so as to receive none, some or all of the coolant coming from the valve body part;
   an engine bypass provided in a third branch coolant circuit and being in fluid communication with the valve body part so as to receive none, some or all of the coolant coming from the valve body part; and wherein the coolant passing through the first branch coolant circuit is delivered back to the pump part after passing through the heat exchange part, and the coolant passing through the second branch coolant circuit is delivered back to the pump part after passing through the heat exchange part and the coolant passing through the third branch coolant circuit is delivered back to the pump part after passing through the heat exchange part.

12. The system according to claim 11, wherein the valve body part further includes a flow wall(s) for flow control within all the coolant branch circuits through varying size openings on the flow wall(s).

13. The system of claim 11 wherein the engine comprises (1) an internal combustion engine and/or an electric engine, (2) a transmission, (3) a unit heater, (4) a radiator, and (5) an engine control module.

14. The system of device of claim 12, further comprising an actuator operable in response to a control signal from a control device so as to selectively operate the movement of the flow wall(s) which opens, varies and/or closes the flow through the outlets of the valve body part.

15. The system of claim 14, wherein the control device is one of the engine control module, a digital signal processor or a smart controller.

16. The system of claim 11, further comprising a pump operably in response to one of a control signal or vehicle operational input values so as to selectively operate the pump flow through the system.

17. A coolant flow control system for a vehicle, comprising:

an engine;

at least one flow branch;

an integrated pump coolant flow control and heat exchange device including a valve body part, a heat exchange part in fluid communication with the valve body part and a pump part in fluid communication with the heat exchanger part, wherein the valve body part is in fluid communication with the engine and all of the at least one flow branch so as to receive all of the coolant coming from the engine and all of the at least one flow branch, and wherein the pump and heat exchange device are integrated;

a radiator provided in a first branch coolant circuit and being in fluid communication with the engine and valve body part so as to deliver none, some or all of the coolant coming from the engine to the valve body part;

a unit heater provided in a second branch coolant circuit and being in fluid communication with the engine and valve body part so as to deliver none, some or all of the coolant coming from the engine to the valve body part;

an engine bypass provided in a third branch coolant circuit and being in fluid communication with the engine and valve body part so as to deliver none, some or all of the coolant coming from the engine to the valve body part; and wherein the coolant passing through the first branch coolant circuit is delivered back to the pump part after passing through the valve body part and the heat exchange part, and the coolant passing through the second branch coolant circuit is delivered back to the pump part after passing through the valve body part and the heat exchange part and the coolant passing through the third branch coolant circuit is delivered back to the pump part after passing through the valve body part and the heat exchange part.

18. The system of claim 17, wherein the valve body part further includes a flow wall(s) for flow control within all the coolant branch circuits through varying size openings on the flow wall(s).

19. The system of claim 17 wherein the engine comprises (1) an internal combustion engine and/or an electric engine, (2) a transmission, (3) a unit heater, (4) a radiator, and (5) an engine control module.

20. The system of claim 18 further comprising an actuator operable in response to a control signal from a control device so as to selectively operate the movement of the flow wall which opens, varies and/or closes the flow through the inlets of the valve body part.

21. The system of device of claim 20, wherein the control device is one of the engine control module, a digital signal processor or a smart controller.

22. The system of claim 17, further comprising a pump operably in response to one of a control signal or vehicle operational input values so as to selectively operate the pump flow through the system.

* * * * *